US009360032B2

(12) United States Patent
Dicaire

(10) Patent No.: US 9,360,032 B2
(45) Date of Patent: Jun. 7, 2016

(54) FASTENING SYSTEM FOR CONNECTING NON-LOAD BEARING WALL TO TRUSS

(71) Applicant: Mark A. Dicaire, Ware, MA (US)

(72) Inventor: Mark A. Dicaire, Ware, MA (US)

(73) Assignee: OMG, Inc., Agawam, MA (US)

(*) Notice: Subject to any disclaimer, the term of this patent is extended or adjusted under 35 U.S.C. 154(b) by 0 days.

(21) Appl. No.: 14/300,783

(22) Filed: Jun. 10, 2014

(65) Prior Publication Data

US 2014/0360123 A1 Dec. 11, 2014

Related U.S. Application Data

(60) Provisional application No. 61/833,135, filed on Jun. 10, 2013.

(51) Int. Cl.
*F16B 25/00* (2006.01)
*F16B 5/02* (2006.01)

(52) U.S. Cl.
CPC ............... *F16B 5/02* (2013.01); *F16B 25/0015* (2013.01); *F16B 25/0063* (2013.01)

(58) Field of Classification Search
CPC ...... F16B 5/0283; F16B 41/002; F16B 43/00; F16B 5/02; F16B 25/0015; F16B 25/0063; Y10S 411/999
See application file for complete search history.

(56) References Cited

U.S. PATENT DOCUMENTS

| | | | | |
|---|---|---|---|---|
| 3,560,132 A * | 2/1971 | Gulistan | ....................... | 411/361 |
| 3,990,438 A * | 11/1976 | Pritchard | ............... | A61B 17/72 606/309 |
| 4,087,896 A * | 5/1978 | Salter | ....................... | F16B 5/02 29/256 |
| 4,193,434 A * | 3/1980 | Wagner | ........................ | 411/154 |
| 4,238,165 A * | 12/1980 | Wagner | ..................... | 403/408.1 |
| 4,640,271 A * | 2/1987 | Lower | ................ | A61B 17/8685 606/105 |
| 4,732,519 A * | 3/1988 | Wagner | ........................ | 411/337 |
| 4,940,467 A * | 7/1990 | Tronzo | ................ | A61B 17/742 606/304 |
| 5,020,951 A * | 6/1991 | Smith | ........................... | 411/107 |
| 5,076,708 A * | 12/1991 | Pierson | ........................ | 374/144 |
| 5,244,325 A * | 9/1993 | Knohl | ............................ | 411/353 |
| 5,317,462 A * | 5/1994 | Kakizaki | ............ | G11B 33/1466 174/564 |
| 5,334,204 A * | 8/1994 | Clewett | .............. | A61B 17/8625 606/312 |
| 5,489,177 A * | 2/1996 | Schmidt, Jr. | ................. | 411/369 |
| 5,498,265 A * | 3/1996 | Asnis | ..................... | A61B 17/74 606/315 |
| 6,595,733 B1 * | 7/2003 | Willert | .......................... | 411/311 |
| 6,623,492 B1 * | 9/2003 | Berube | .............. | A61B 17/0642 411/2 |
| 8,262,330 B2 * | 9/2012 | Ishino | ...................... | B41J 29/02 411/55 |
| 8,828,067 B2 * | 9/2014 | Tipirneni | ............. | A61B 17/742 606/320 |
| 9,017,329 B2 * | 4/2015 | Tyber | ................ | A61B 17/1717 411/457 |

FOREIGN PATENT DOCUMENTS

GB 1498838 A * 1/1978 ............. F16B 19/05

\* cited by examiner

*Primary Examiner* — Jeanette E Chapman
(74) *Attorney, Agent, or Firm* — Alix, Yale & Ristas, LLP

(57) ABSTRACT

A fastener assembly for connecting a non-load bearing wall to a truss comprises a fastener with a sleeve retained on the fastener and axially displaceable along the fastener. The fastener has unthreaded shank portion and the sleeve is disposed about the unthreaded shank portion. The sleeve has a length less than the axial length of the unthreaded shank portion. The fastener assembly is employed to form a truss/non-load bearing wall connection system, wherein the non-load bearing wall is disposed below the truss and has a top plate with at least one bore. A fastener assembly is disposed in each bore and threaded into the truss so that a gap is formed between the truss and its top plate. Upon deflection of the truss, one or more fasteners vertically slide axially relative to its associated sleeve.

14 Claims, 8 Drawing Sheets

FASTENING SYSTEM FOR CONNECTING NON-LOAD BEARING WALL TO TRUSS

BACKGROUND

This disclosure relates generally to connections between trusses and non-load bearing walls.

Interior non-load bearing walls are typically framed approximately ½ inch to ¾ inch below the load bearing components. Such components take the form of floor joist, floor trusses, roof trusses, etc. This gap allows the load bearing components to deflect under the pre-designed loads.

If the non-load bearing walls are built flush to the underside of the load bearing components, they can essentially become load bearing or quasi-load bearing. Consequently, the truss or joist is not going to react and deflect in the same manner as designed due to the additional load bearing. Furthermore, loads would then be transferred to structural components that are not designed to handle the loads. The latter would typically result in dips in floors, the cracking of finished work and actual failure of a component.

Of course, the non-load bearing walls still require bracing against lateral movement which is typically the goal of the fastening between the non-load bearing wall and the truss or other load bearing structure.

SUMMARY

Briefly stated, a fastener assembly is configured for connecting a non-load bearing wall to a truss. A fastener comprises a head and an axially extending shank which has an unthreaded shank portion and a threaded shank portion adjacent a distal end. A sleeve is retained on the fastener and disposed about the unthreaded shank portion and is axially displaceable along the unthreaded shank portion.

The sleeve has opposed ends. One end is engageable against the thread of the threaded portion for retaining the sleeve between the head and the threaded portion. The sleeve is preferably a plastic member. A preferred flange embodiment includes a disposed adjacent the head and a tapered neck adjacent the flange and integrally connecting the shank.

The head, flange and neck each have a maximum diameter. The threaded portion has a major diameter. The sleeve has a generally uniform outside diameter which is less than the maximum diameter of the head, flange or neck, and the outside diameter is less than the major diameter of the threaded portion. The unthreaded shank portion extends an axial length greater than the longitudinal length of the sleeve.

In one embodiment, the axial length of the fastener is approximately 6 inches, and the unthreaded shank portion has a length of approximately 4 inches. The sleeve has a length of approximately 3 inches.

In another embodiment, the fastener has an axial length of approximately 4 inches, and the sleeve has a length of approximately 1½ inches.

In one embodiment, a fastener assembly for connecting a non-load bearing wall to a truss comprises a fastener and a sleeve retained on the fastener. The fastener has a head, an enlarged flange and a tapered neck which integrally connects with a shank having an axially extending unthreaded portion and a threaded portion. The threaded portion comprises a thread with a major diameter. The sleeve has an axial length less than the axial length of the unthreaded portion and is disposed about the unthreaded portion and axially displaceable along the unthreaded portion. The sleeve has a generally uniform outside diameter which is less than an outside diametrical portion of the neck or the flange and is less than the major diameter of the thread. The head is a hex head. The sleeve is plastic.

A truss/non-load bearing wall connection system comprises a truss, a non-load bearing wall is disposed below the truss and includes a top plate defining a bore. A fastener carries a sleeve disposed in the bore and is threaded into the truss wherein a gap is formed between the truss and the top plate. The fastener is slidable relative to the sleeve.

The fastener has a shank with an unthreaded portion and a threaded portion, and the unthreaded portion slides relative to the sleeve. The sleeve has an axial length which is less than the axial length of the unthreaded portion of the fastener. The sleeve is preferably a plastic member. The fastener has a head and an enlarged portion with an enlarged diameter adjacent the head. The sleeve has an outer diameter less than the enlarged diameter.

In one embodiment of the connection system, the top plate has a multiplicity of bores and a multiplicity of fasteners carrying an associated sleeve are received in a bore and threaded into the truss, so that upon deflection of the truss, at least one fastener slides vertically relative to the associated sleeve.

DETAILED DESCRIPTION

Figure 1:
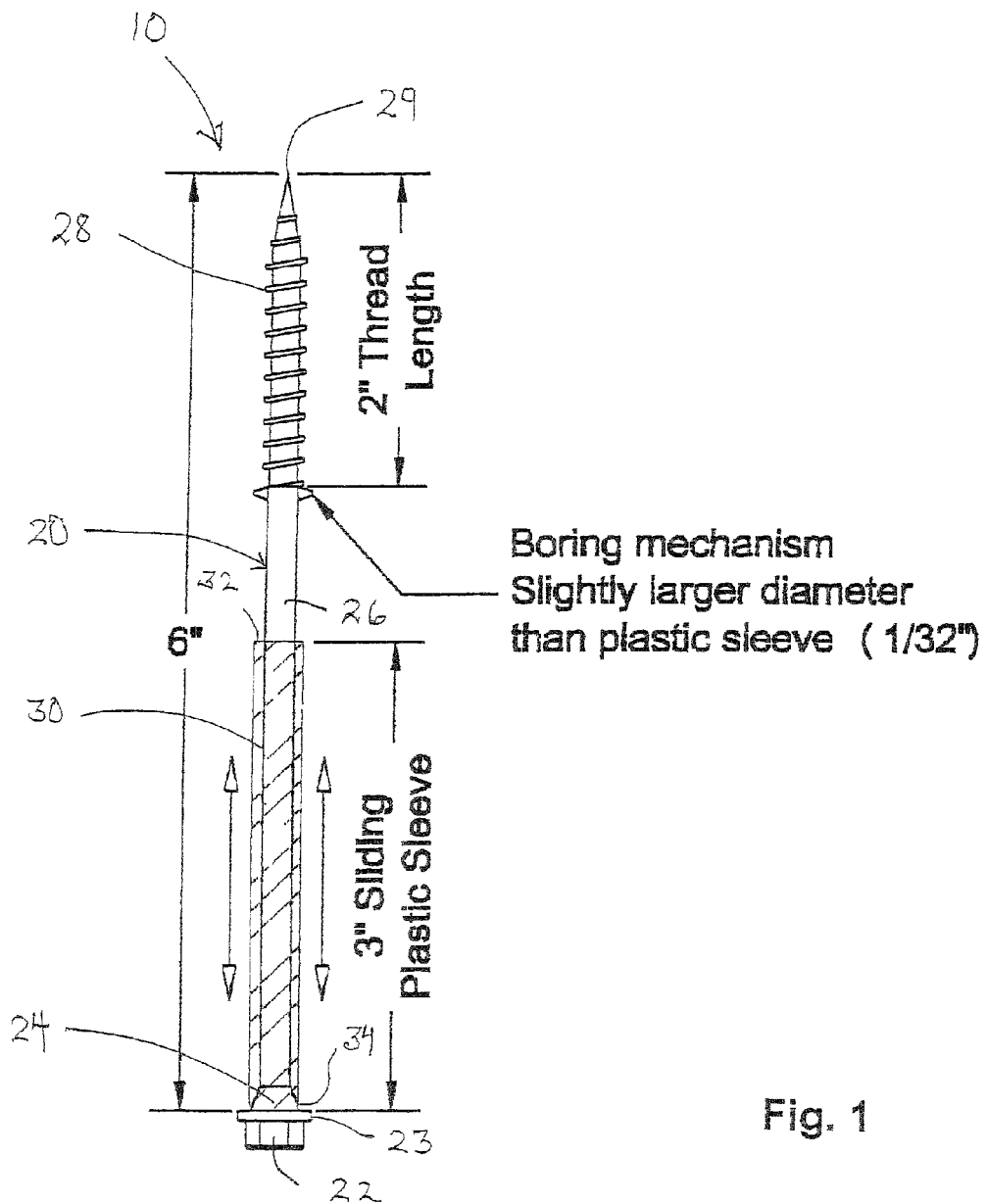
FIG. 1 is an annotated side elevational view, partly in diagram form and partly in schematic, of a fastening assembly adapted for use with dual-top plates of a non-load bearing wall.
Figure 2:
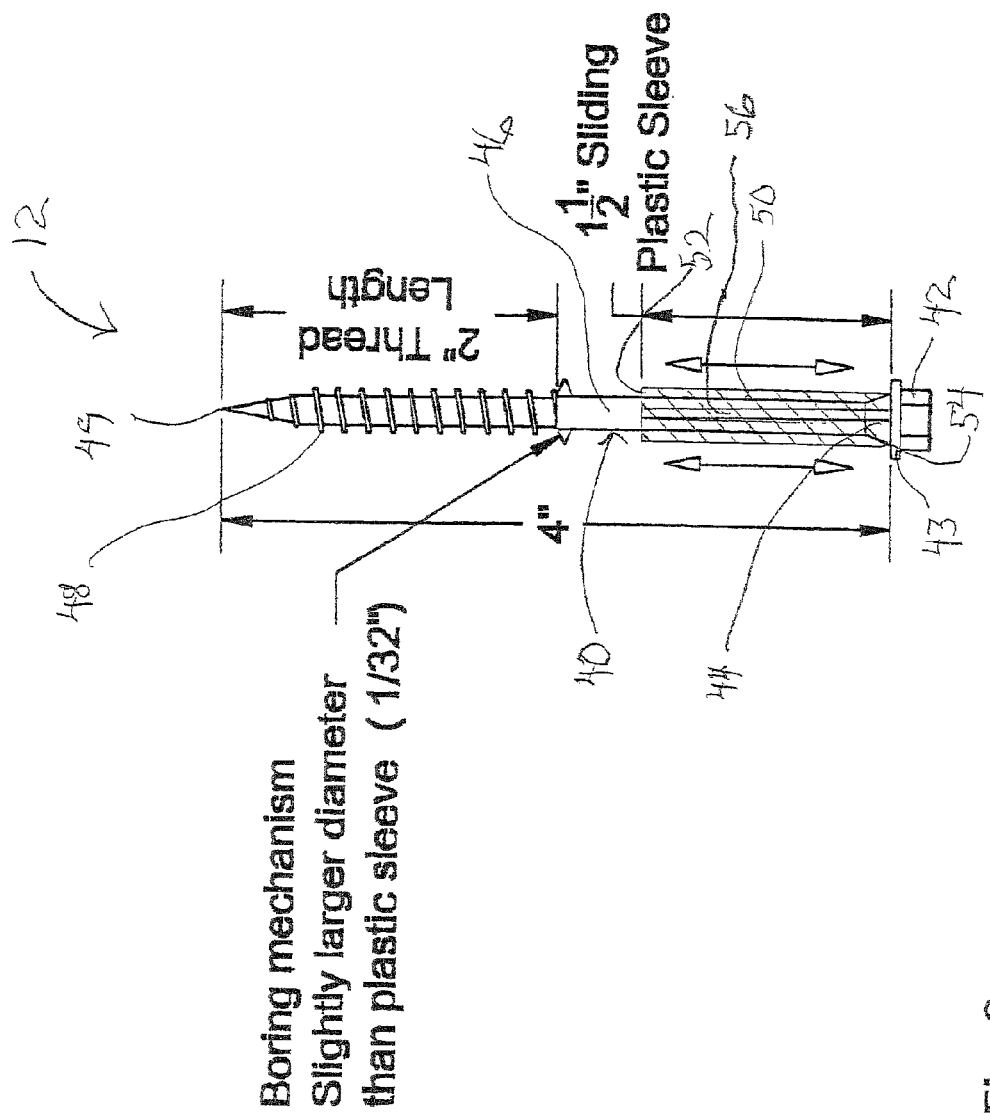
FIG. 2 is an annotated side elevational view, partly in diagram form and partly in schematic, of a fastening assembly adapted for use with a single top plate of a non-load bearing wall.

With reference to the drawings, wherein like numerals represent like parts throughout the figures, a fastening assembly for connecting a non-load bearing wall to a truss is generally designated by the numeral 10 in FIG. 1 for a non-load bearing wall with dual top plates and by the numeral 12 in FIG. 2 for a non-load bearing wall with a single top plate.

With reference to FIG. 1, the fastening assembly 10 comprises a fastener 20 which preferably has a six-inch axial length as indicated. The fastener 20 includes a hex head 22 which may include an integral retaining washer or flange 23 adjacent a tapered or frusto-conical neck 24. Other head/retainer flange/neck configurations are possible. An unthreaded cylindrical shank portion 26 axially extends approximately four inches from the conical neck 24 adjacent head 22 and integrally connects with a two-inch threaded distal end portion 28 terminating in a distal tip 29.

Figure 8:
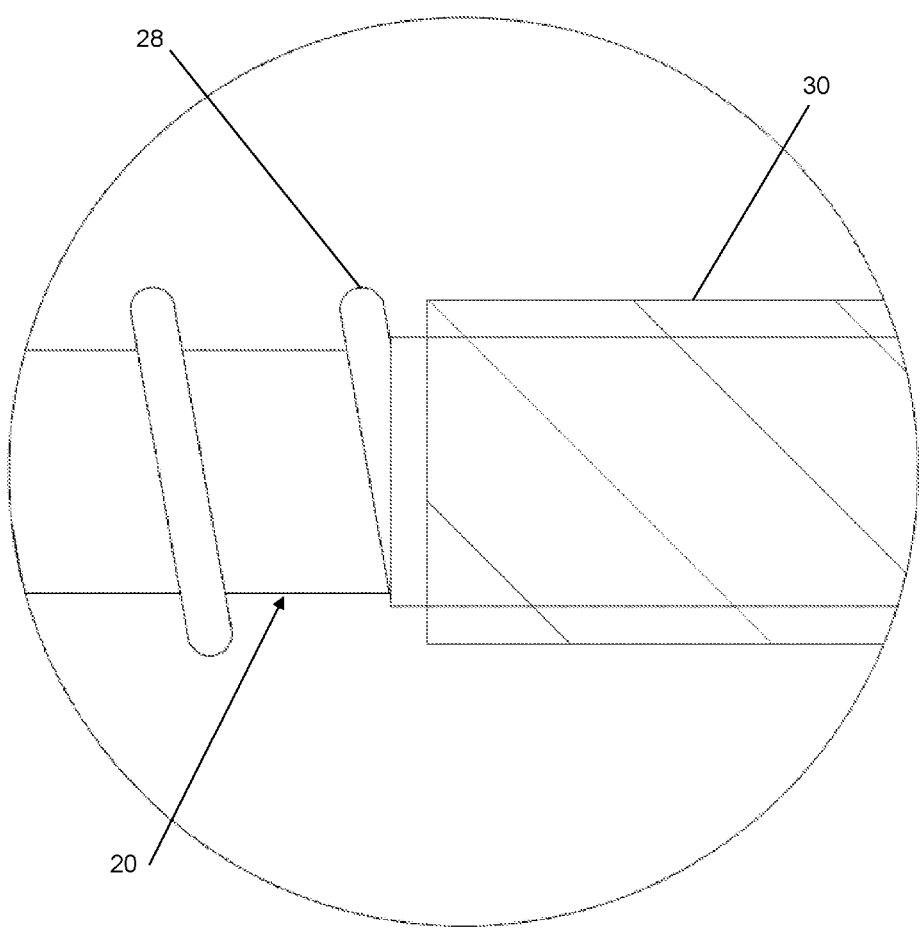
FIG. 8 is an enlarged, partial side view of an alternate embodiment of a fastening assembly adapted for use with dual-top plates of a non-load bearing wall depicting interaction between the sleeve and threaded portion of the fastener in greater detail.

A slidable sleeve 30 surrounds the unthreaded shank portion 26 and is essentially adapted to axially slide along the unthreaded shank portion (as indicated by the FIG. 1 arrows). The sleeve 30 is preferably formed from plastic. In a preferred form, the sleeve 30 axially extends approximately three inches and has a uniform outer diameter which is less than the outside diameter of the head flange 23. The sleeve 30 is axially retained to the fastener 20 by the opposed ends 32 and 34 respectively engaging the thread on the threaded portion 28 and the flange 23 and/or the neck 24. In the embodiment depicted in FIG. 8, the slideable sleeve 30 is axially fixed by the threaded portion 28 of fastener 20. In this embodiment, the external diameter of the sleeve 30 is less than the major diameter of the threaded portion 28.

Fastening assembly 12 is substantially the same as fastening assembly 10 except for the dimensions of the components. The fastener 40 axially extends approximately four inches with a distal thread 48 having a two-inch length. Consequently, the axial length of the unthreaded shank portion 46 is approximately two inches. The unthreaded portion 46 is surrounded by a slidable plastic sleeve 50 which axially extends approximately 1½ inches. The sleeve 50 is adapted to axially slide (as indicated by the FIG. 2 arrows) along the unthreaded portion 46. The uniform outside diameter of the sleeve 50 less than the outside diameter of the head 42 or the outside diameter of the flange 43. The sleeve 50 is axially retained to the fastener by the opposed ends 52 and 54 respectively engaging the flange 43/neck 44 or the proximal end threading of the threaded portion 48.

Figure 3:
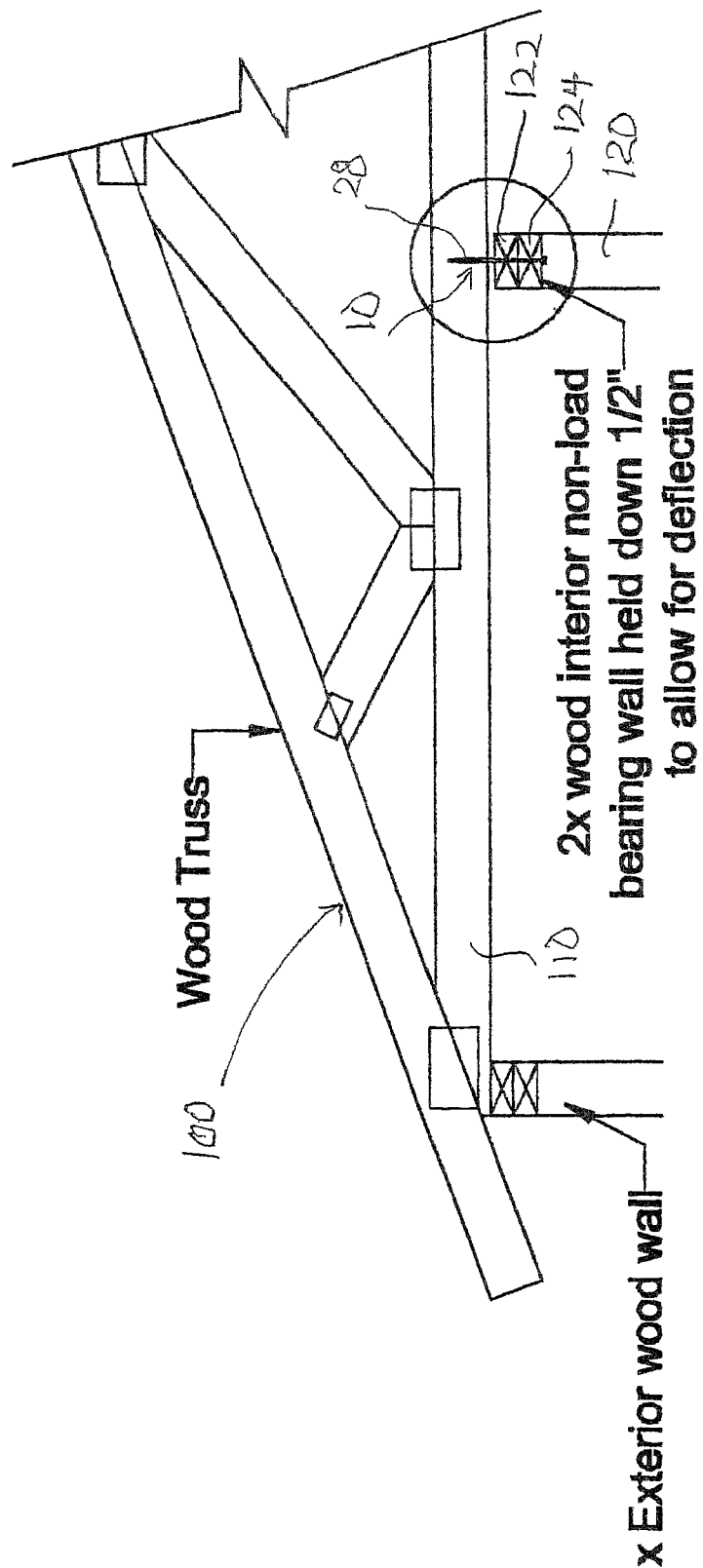
FIG. 3 is an annotated side elevational view illustrating a dual-top plate of a non-load bearing wall which is connected to a truss (partly illustrated) by the fastening assembly of FIG. 1.

The preferred application for fastener assembly 10 and fastener assembly 12 resides in connecting a non-load bearing wall to a horizontal beam of a wood truss. As shown in FIG. 3, the wood truss 100 includes a horizontal support beam 110 which is typically designed to deflect under a load or flex over time. The vertical non-load bearing wall 120 includes a pair of horizontal top plates 122 and 124. Alternatively, for some constructions, one single top plate 122 may be provided on the wall.

Figure 4:
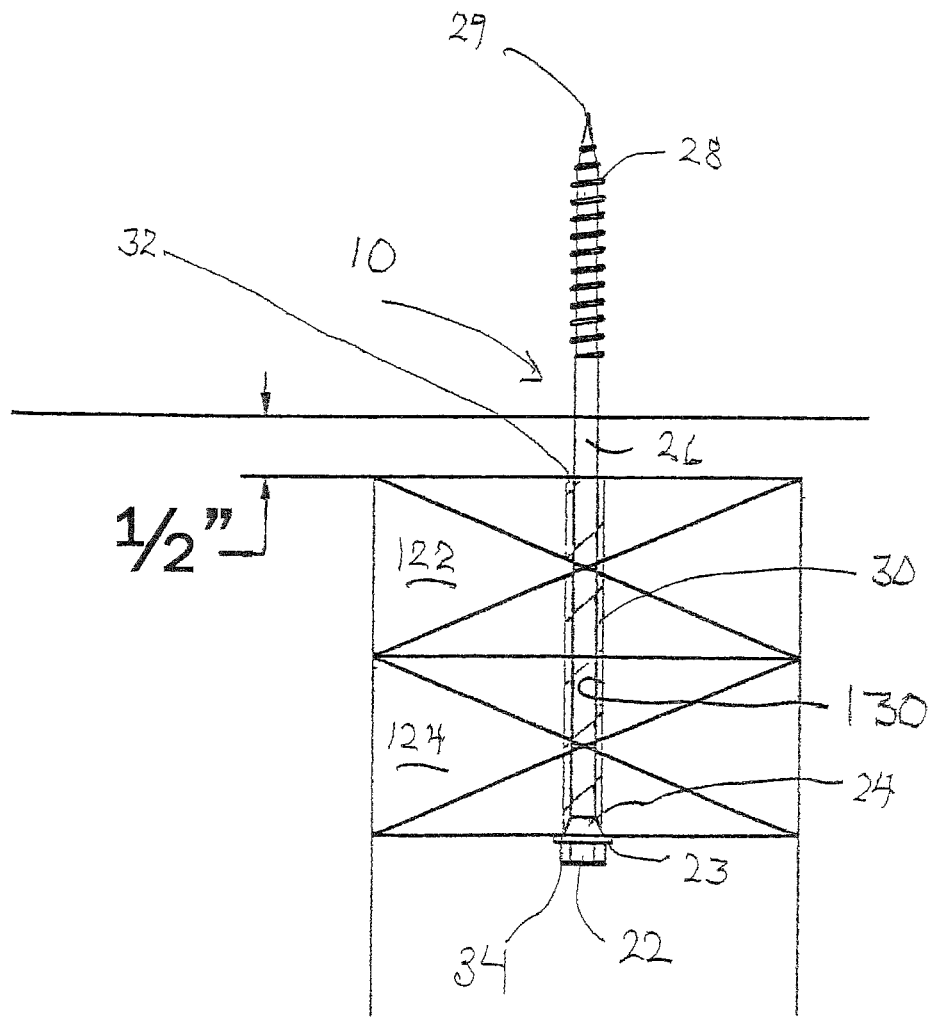
FIG. 4 is an enlarged view, partly in diagram form, of a portion of the truss, the non-load bearing wall and the fastener assembly of FIG. 3.

In a preferred installation method, a bore 130 which is substantially the same diameter as that of the plastic sleeve 30 or slightly larger, such as perhaps ¹⁄₃₂ inch, is drilled vertically through the top plates 122 and 124. The fastener assembly 10 is then inserted into the bore 130 (FIG. 4) and the head 22 is torqued until the fastener threads of the threaded potion 28 thread through the underside into the support beam 110 of the wood truss. It will be appreciated that the plastic sleeve 30 is received in the bore 130 and the head 22 is torqued so that the flange 23 engages against the underside of the interior most top plate 124.

Figure 5:
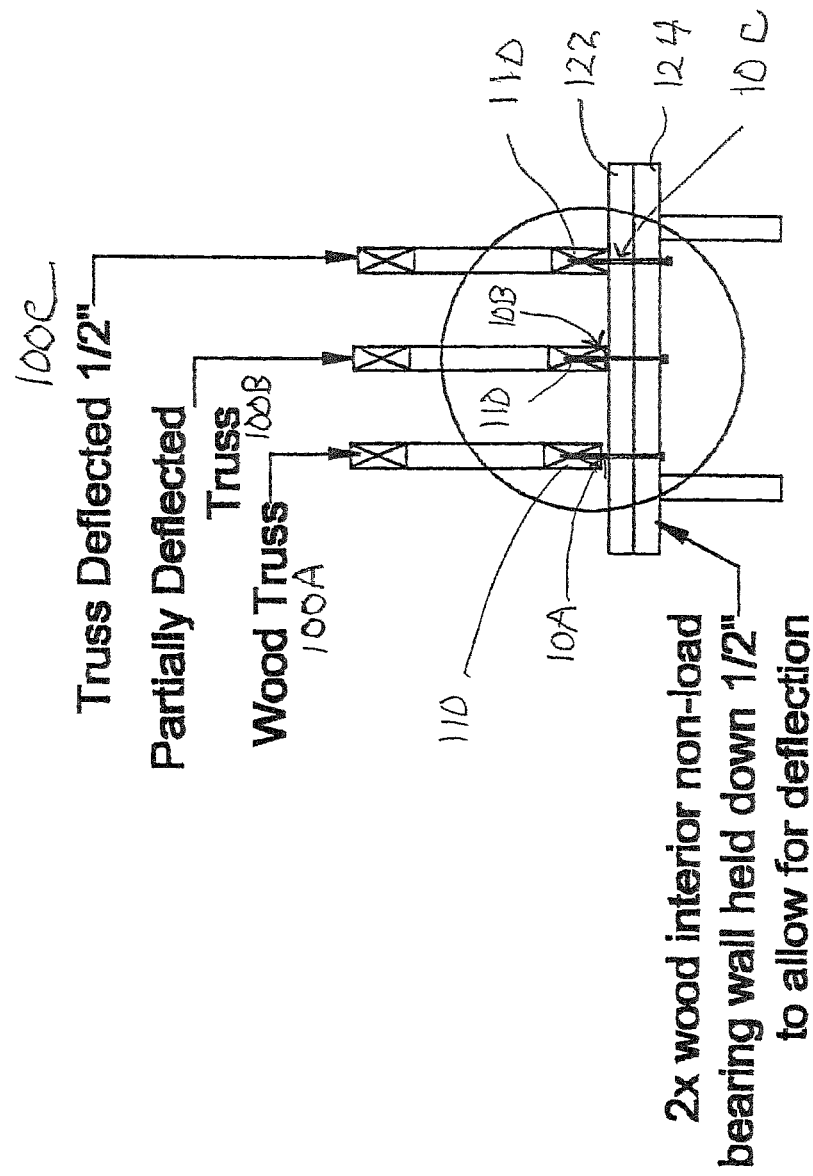
FIG. 5 is an annotated end view illustrating a connection system employing the fastener assembly of FIG. 1 for connecting two top plates to a truss and further illustrating various representative deflection characteristics.
Figure 6:
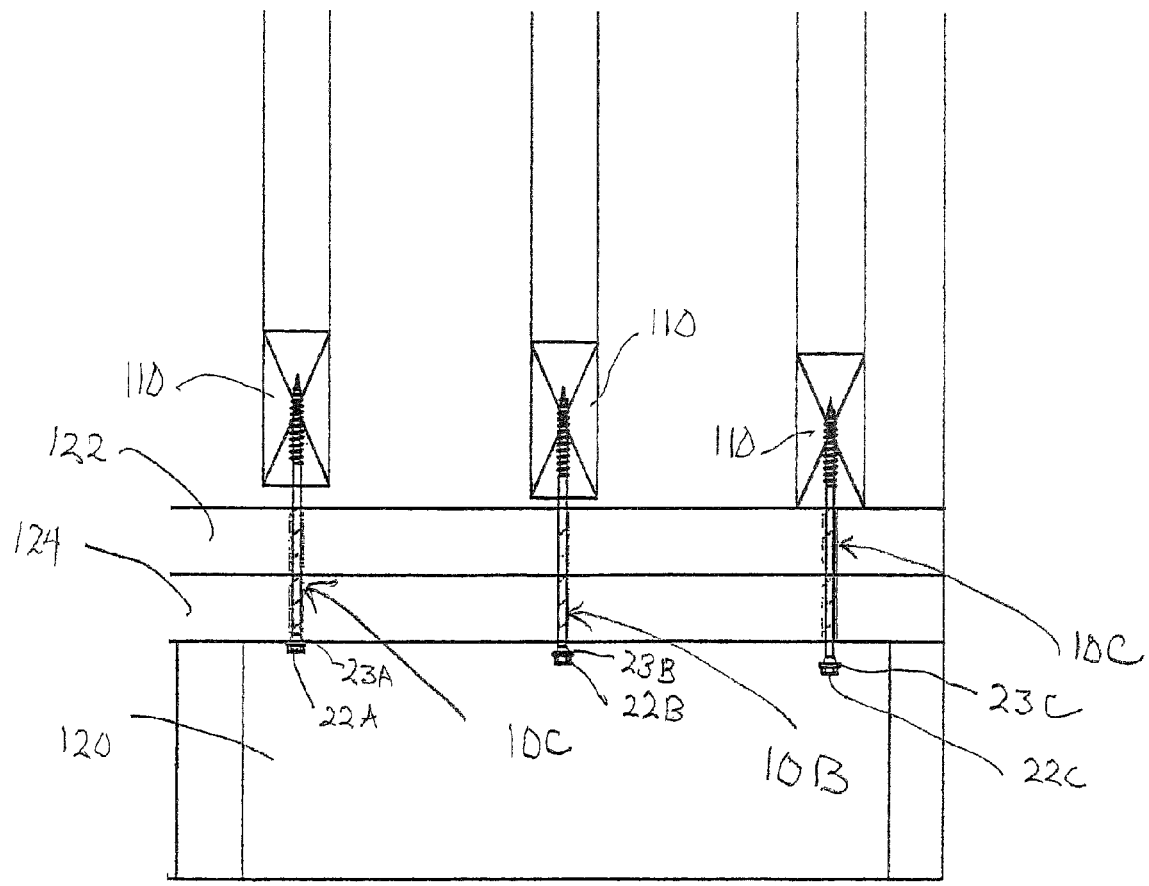
FIG. 6 is an enlarged fragmentary end view of the truss/non-load bearing wall and connection system of FIG. 5.
Figure 7:
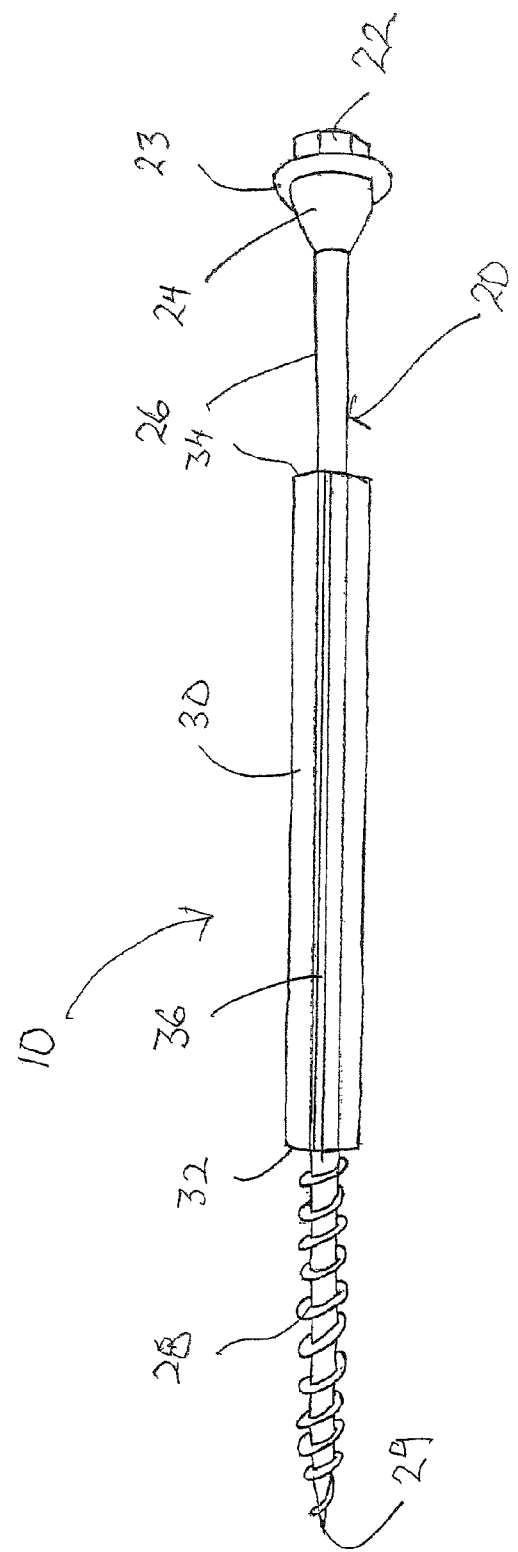
FIG. 7 is an enlarged side view of the fastening assembly of FIG. 1 with a sleeve being slidably displaced along the shank of the fastener.

As illustrated in FIGS. 5 and 6 which show various deflected portions of the beam 110 relative to the top plate 122 of the non-load bearing wall 120, three installed fastener assemblies 10A, 10B and 10C are illustrated. Fastener assembly 10A is installed at a location of a truss 100A which does not exhibit any deflection. The fastener assembly 10B is installed at a location of truss 100B which, over time, slightly deflects so that the head 22B is slightly displaced from the underside of the innermost top plate 124 and the unthreaded portion slides in the sleeve 30B. The sleeve 30B may also be free to slide in the bore 130 to accommodate the deflection.

For installed fastener assembly 10C, a more pronounced deflection of truss 100C is illustrated wherein the head 22C of the fastener assembly is axially displaced (horizontally) relative to the top plates and the unthreaded portion slides in the sleeve 30C. The sleeve 30C may also be free to slide in the bore 130 to accommodate the deflection. The head 22C/flange 23C is spaced from the underside of the plate 124.

It will be appreciated that the fastening assembly functions so that although axial or horizontal deflection is accommodated, there is no lateral or non-vertical deflection of the fastener assembly and, consequently, of the secured load bearing wall since the sleeves 30 and 50 vertically engage the cylindrical wall of the associated bore 130 to resist any lateral or non-vertical movement of the fastener relative to the non-load bearing wall.

It will be appreciated that the same characteristics apply for a single top plate. In this case, upon deflection, the head 42 of the fastening assembly 12 will be axially displaced relative to the bore 130 and the plastic sleeve 50 will allow the fastener to vertically accommodate any deflection while laterally maintaining the load bearing wall relative to the truss.

In one manufacturing process, the sleeve 30 is formed from a plastic material with an axial side slit 36. The sleeve is forced over the unthreaded shank portion 24 of the fastener and snaps into a snug (but axially sliding fit) fit around the unthreaded shank portion 24. Sleeve 50 also preferably has an axial slit 56 to facilitate mounting to the fastener 40.

The foregoing fastener assemblies 10 and 12 function in a highly efficient manner and can be efficiently installed with a screw gun and can be so installed for numerous applications without a ladder or a pneumatic gun. In addition, the fastener assemblies may be installed in a labor-efficient manner. The fastener assemblies 10 and 12 are relatively inexpensive. Upon installation, the plastic sleeve 30 or 50 contacts only against the metal fastener and surrounding wood bore wall, and thus neither fastener assembly 10 or 12 presents any squeaking issues.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A fastener assembly for connecting a non-load bearing wall to a truss comprising:
    a fastener comprising a head a flange having a maximum diameter adjacent said head, an axially extending shank comprising an unthreaded shank portion and a threaded shank portion having a major diameter adjacent a distal end, and a tapered neck having a maximum diameter adjacent said flange and integrally connecting said shank; and
    a cylindrical sleeve having opposed ends and a generally uniform external diameter and a generally uniform internal diameter disposed between said opposed ends, said sleeve retained on said fastener and disposed about said unthreaded shank position and axially displaceable therealong;
    wherein said sleeve external diameter is less than the maximum diameter of the flange or neck and the sleeve external diameter is less than the major diameter of the threaded portion.

2. The fastener assembly of claim 1, wherein said sleeve has opposed ends, one end engageable against a thread of said threaded portion for retaining said sleeve between said head and said threaded portion.

3. The fastener assembly of claim 1, wherein said sleeve is a plastic member.

4. The fastener assembly of claim 1, wherein said sleeve has a longitudinal length, and said unthreaded shank portion extends an axial length greater than the longitudal length of said sleeve.

5. The fastener assembly of claim 1, wherein said fastener has an axial length of approximately 6 inches, and said unthreaded shank portion has an axial length of approximately 4 inches.

6. The fastener assembly of claim 5, wherein said sleeve has a length of approximately 3 inches.

7. The fastener assembly of claim 1, wherein said fastener has an axial length of approximately 4 inches, and said sleeve has a length of approximately 1½ inches.

8. The fastener assembly of claim 1, wherein said flange and neck each have a maximum diameter, said neck has a minimum diameter, and said threaded portion has a major diameter, and said sleeve internal diameter is greater than the minimum diameter of the neck and the sleeve external diameter is less than the major diameter of the threaded portion.

9. The fastener assembly of claim 8, wherein said sleeve is axially fixed to said fastener by the friction between said sleeve internal diameter and the diameter of said neck.

10. A fastener assembly for connecting a non-load bearing wall to a truss comprising:
- a fastener comprising a head, an enlarged flange and a tapered neck which integrally connects with a shank having an axially-extending unthreaded portion and a threaded portion comprising a thread with a major diameter; and
- a sleeve retained on said fastener and having an axial length less than the axial length of said unthreaded portion, and disposed about said unthreaded portion and axially displaceable thereon, said sleeve having a generally uniform external diameter which is less than an outside diametrical portion of said neck, or said flange and is less than the major diameter of the thread of the threaded portion.

11. The fastener of claim 10, wherein said head is a hex head.

12. The fastener of claim 10, wherein said sleeve is plastic.

13. The fastener of claim 10, wherein the fastener has a length of approximately 6 inches, and the sleeve has a length of approximately 3 inches.

14. The fastener of claim 10, wherein the fastener has a length of approximately 4 inches, and the sleeve has a length of approximately 1½ inches.

* * * * *